Dec. 12, 1961   R. E. MORSE   3,012,271
ELECTRICAL TREATMENT OF ANIMALS
Filed June 21, 1961   2 Sheets-Sheet 1

INVENTOR
Roy E. Morse

ATTORNEYS 3,012,271
ELECTRICAL TREATMENT OF ANIMALS
Roy E. Morse, New Brunswick, N.J., assignor to Reliable Packing Company, Chicago, Ill.
Filed June 21, 1961, Ser. No. 118,649
17 Claims. (Cl. 17—45)

This invention relates to a method for electrically stunning animals, and has particular utility in connection with the rendering of meat animals unconscious before they are slaughtered.

Heretofore such animals as hogs, sheep, calves and beef cattle actually have been slaughtered either by being restrained and having the jugular vein cut, or in the case of beef cattle by being struck on the forehead to stun them, following which they are bled. This is objectionable because of the inhumane method of slaughter, and also because of the fact that violent reactions in the case of certain large animals raises the possibility of injury to both the animal and the operator. Certain attempts have been made to use electric current to stun the animal prior to slaughter. These attempts have usually employed 60-cycle A.C. current, which has not been acceptable to the meat inspection division of the Department of Agriculture because it produces lung and other hemorrhages, which are not distinguishable from those produced by cholera and other diseases of meat animals.

It is an object of this invention to stun an animal preparatory to slaughter so as to eliminate excessive muscular contraction and/or hemorrhages, and to produce loss of consciousness and prepare the animal for slaughter in the most humane manner.

It is also an object of the present invention to stun such animals in such a manner as to maintain the unconscious state for a sufficient time to allow the slaughtering operation to be completed without having the animal regain consciousness.

Still another object of the present invention is to provide a method employing a particular type of electric-current application which will not cause excessive muscular spasms and/or hemorrhaging, but will produce coma in the animal to be slaughtered, which coma lasts for a considerable duration of time after application of the current has ceased.

It has long been known that unconsciousness results from the application of a sufficient amount of current to the brain of an animal in order to block the nervous system. There is a considerable amount of literature concerning experiments made over a period of a number of years on various types of animals attempting to produce unconsciousness without resulting damage to the value of the animal with respect to the quality of the meat, and with respect to the ability of the carcass, when slaughtered, to pass rigid meat inspections. It is also well known that generally when electric potentials are applied to the brain, severe muscular contraction results, and this contraction is often so violent as to cause damage which can not be tolerated. In order for a method of stunning to be comfortably feasible, it must be quick, meaning that the stunning current is applied for an interval of only relatively few seconds. A greater time of application is not only undesirable because it slows up production too much, but is also undesirable because it increases likelihood of damage to the animal and/or injury to the operator who is applying the stunning current. Therefore the total dosage must be great, and must be administered over a very short interval of time. On the other hand, if the currents through the brain are increased in order to shorten the time of application, the frequency of damage and the extent of damage, especially damage caused by spasms and hemorrhaging, greatly increase. The applicant has found that the best results are obtained by using spaced unidirectional pulses, preferably of rectangular shape, and preferably applied in a gradually-tapered manner as will be hereinafter more fully discussed.

The factors leading to this selection of wave form and application thereof are believed to be acceptable in terms of the following theoretical discussion. As stated above, one prior-art method employs alternating current applied with cyclically reversing polarity. The applicant tried to duplicate prior-art experiments and found that the results of the use of alternating current produced very considerable damaging effects in the animal, and the production of unconsciousness in the animal appeared to be inseparable from these damaging effects. The alternating current produces severe spasms in the muscles around the various blood vessels, and contracts them violently first in one direction and then in the other direction, which swinging motions tend to break the blood vessels. It is now established that the nature of the nervous system is electrical, and that the nervous system can respond to electrical stimulation within certain limits, but if these limits are exceeded electrical saturation takes place and the nerves become non-responsive to increases in the amount of current in the same polarity as the current which produced the original saturation. Thus, if the polarity continuously reverses, the nervous system which became saturated by current flowing with one polarity and at such an amplitude as to be beyond the ability of the nervous system to respond, when the polarity reversed, these same nerves could then respond to current flowing in the opposite direction until the current reached a saturation level in that direction. If this reasoning is correct, then no continuous saturation would result from an alternating current applied to the nervous system, but rather the nervous system would be alternately responsive to the part of the current in each half cycle, or at least the nervous system would be responsive to the degree that it remains still unfatigued beyond its response limit. This theory has been apparently substantiated by experiments in which the frequency of reversal of the alternating current polarity was slowed down until the reversals occurred at a visible rate. As this frequency diminished to a visible rate, the jumping of the muscles each time the polarity of the current reversed also became visible, and, although eventually the nervous system became fully fatigued and therefore nonresponsive to further stimulation, an enormous amount of contractions in opposite directions had already taken place. These contractions contribute enormously to the damage to the meat and to the animal's organs.

It is the specific object of this invention to provide a type of current and application which minimizes the amount of nervous system contractions while at the same time producing the desired narcosis. Such narcosis is believed to result when the nervous system becomes polarized so that it can not carry further electrical messages. The applicant believes that a direct current applied preferably in individual bursts of energy produces the desired polarization and resulting blocking of the nervous system without producing the undesirable cycling of the nervous system to saturation in opposite polarity directions which produces the reversing muscular twitches. In other words, the direct current polarizes always in the same direction, whereas the alternating current only fatigues the nervous system by driving it to electrical saturation in successively opposite polarity directions.

Not just any direct-current application produces the desired results, however. It has been found very desirable to break up the direct current into individual unidirectional pulses which are spaced apart by intervals of time at least equaling the duration of each pulse. The length of time required for a total dosage is a function of the repetition frequency of the pulses, of the duty cycle, which can be expressed in terms of average current versus peak current, and the application of a sufficient number of pulses at a sufficient amplitude to produce the required unconsciousness. As a matter of actual experiments, the applicant has found that by lengthening the interval between the pulses within the limits specified below, the tendency toward muscular spasms and/or hemorrhaging can be greatly reduced.

In addition to the use of the proper wave shape pulse amplitude frequency and total duration, the applicant has also found that the application of pulses in which the amplitude from pulse to pulse if graduated is highly effective in reducing the shock to the nervous system. For instance, it is a distinct advantage to apply the pulses beginning at a very low amplitude and gradually building the amplitude up from pulse to pulse until the final peak amplitude is reached. It is also advantageous to gradually diminish the amplitude at the end of the treatment rather than to suddenly cut off the pulses at their full amplitude. In fact, gradual increase from ¼ to ⅓ of the duration and/or gradual decrease during the last ⅓ to ¼ of the duration is recommended to reduce the total shock to the nervous system.

The applicant believes that the reason for these advantages residing in the gradual tapering of the pulse amplitude can be explained by noting that the nervous system is most sensitive at the time of the application of the first few pulses. Because of this greater initial sensitivity, which sensitivity decreases as the nervous system fatigues, if the first pulse is applied at full amplitude, the tendency is to produce the maximum muscular contraction of which the animal is capable. On the other hand, the application of a small pulse initially produces only a small reaction, and the amplitude of the successive pulses can then be increased also without producing a maximum contraction because when each successively larger pulse is applied, it is applied to a nervous system which is rapidly becoming less and less sensitive. Thus, the large shock to the nervous system which would result by application of the full current to a fully receptive nervous system is avoided, such maximum shock conditions producing such violent muscular contractions that blood is squeezed out through the capillaries, hemorrhaging. Conversely, the applicant finds that it is also advantageous to taper off the amplitude of the pulses applied toward the end of the treatment, and not simply stop after the final pulse delivered at maximum amplitude. The continued application of the unidirectional pulses causes muscular tension to build up with each pulse and this muscular tension builds up capillary pulses to a high degree. If, then, the stimulus of the electricity is suddenly completely removed, the muscular tension is also suddenly released, and this sudden release causes the capillaries to burst. On the other hand, if the peak current is gradually diminished, the tension can also be gradually brought to rest and thereby avoid this type of hemorrhaging. Through such diminishing, however, the nervous system remains polarized because it is not subjected to currents of opposite polarity that would tend to unpolarize the system, as is the case when alternating currents are employed. Once the nervous system has been polarized as outlined above, the communication pathways through the nervous system are disrupted and remain so for quite a while for reasons analagous to the reasons why the human brain can be treated with electrical currents to obliterate certain past recollections. It is therefore the object of the applicant's invention to provide a method for stunning animals which produce narcosis quickly without shocking the nervous system of the animal to such an extent as to produce violent internal convulsions resulting in internal damages.

The various features of novelty which characterize this invention are pointed out with particularity in the claims annexed to and forming part of this specification.

For a better understanding of the invention, its advantages and specific objects obtained with its use, reference may be had to the accompanying drawings and descriptive matter in which have been illustrated and described the preferred embodiment of the invention.

Figure 1:
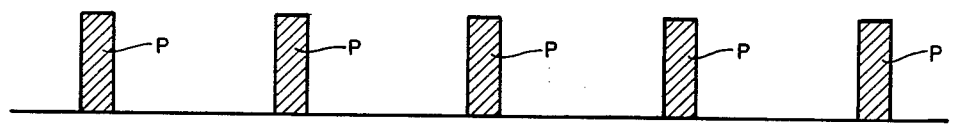
FIG. 1 is a graphical representation showing a preferred wave form for the applied current according to the invention.
Figure 6:
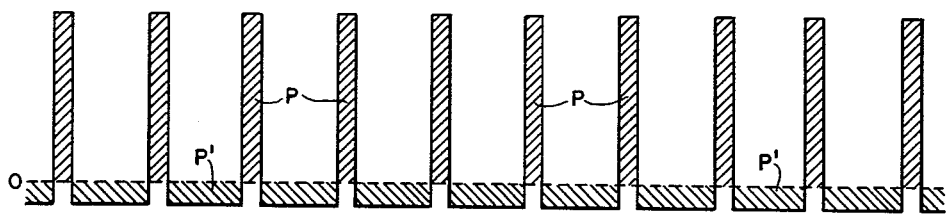
Figure 7:
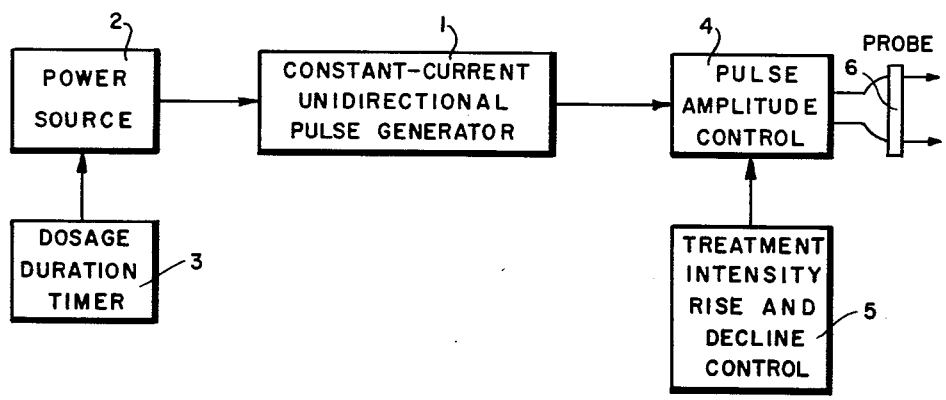

FIG. 6 is a view similar to FIG. 1, but showing a modified pulse wave form in which the gap between pulses is great as compared with the width of each pulse, and in which the negative cycles between the useful positive pulses are insignificantly small peak amplitude; and FIG. 7 is a block diagram illustrating a pulse generating and applying system suitable for carrying out the claimed method of the invention.

Figure 2:
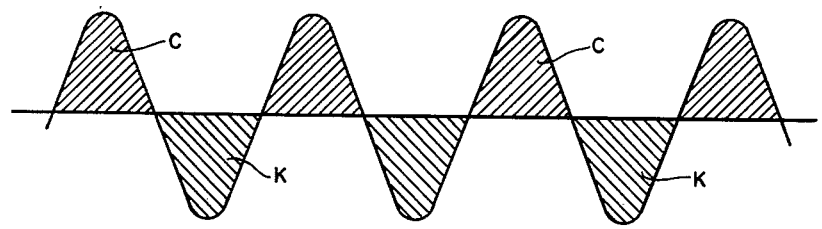
FIG. 2 is also a graphical illustration, but of a 60-cycle wave form commonly used according to the prior art.

Referring now to the drawings, by a comparison of FIGS. 1 and 2 it will be seen that the pulses P of FIG. 1 are unidirectional, these pulses being positive as illustrated in FIGS. 1, 3, 4, 5 and 6, although unidirectional negative pulses would work equally well. By comparison of the pulses P with the positive and negative sine wave cycles, respectively C and K, it will be seen that the sine wave of FIG. 1 provides current flow in which the alternate half cycles produced a reversal of the polarity. The principal disadvantage of this type of current, on a practical basis, lies in the severity of the muscular contractions which result from its use and which cause excessive damage to the muscle tissue. This damage is most serious in the vicinity of the lungs for the reasons set forth above. In extreme cases, the muscular contractions have been so severe as to cause bones to break, in addition to the hemorrhages in the lungs, so that the meat is actually rendered unfit for consumption in addition to the fact that the carcass has great difficulty in passing inspection designed to determine its fitness for food purposes.

The results of an extensive investigation undertaken by the applicant to determine the various factors involved indicate that the production of satisfactory narcosis requires the application of a peak current of suitable amplitude for a sufficient time duration, and that adequate dosage was the principal factor involved in providing a sufficiently long recovery time of the nervous system after such dosage and prior to the regaining of consciousness. In addition to the factors of peak current and duration of application, the amount of damage to the animal by such treatment appears to depend on the character of the current applied, wether A.C. or D.C.; upon the duty cycle of that current when applied in pulses, meaning the "on"-time as compared with the "off"-time during each complete cycle; upon the electrical response of the animal, which depends to a great extent on the type of device used to diminish the current; and upon the rate of build-up and decay of the current pulses from one pulse to the next during the initial and final stages of the application of each treatment.

As an illustration of the dependency on the current value to produce the desired unconsciousness, the applicant provides the following illustrative table summarizing a series of experiments conducted on rats. During each of these trial runs, a series of direct-current pulses were required for a total duration of 1.5 seconds, the individual pulses each being of 0.7 millisecond duration and spaced apart by 5 milliseconds. From the results of this table, it will be seen that a peak current of 50 milliamperes produced no unconsciousness, but that when the current was subsequently increased, unconsciousness was produced, and the duration of this unconsciousness after completion of the treatment varied between 1 minute and 10 minutes in a manner which depended directly upon the value of the peak current.

TABLE A

*Current applied for insensibilty in rats*

| Average Current, ma. | Peak Current, ma. | Comments |
| --- | --- | --- |
| 5 | 50 | Not Unconscious. |
| 13 | 100 | Unconscious 1–2 mins. |
| 20 | 160 | Unconscious 2.5 mins. |
| 40 | 300 | Unconscious 4.5 mins. |
| 60 | 410 | Unconscious 6 mins. |
| 80 | 550 | Unconscious 10 mins. |

When other factors are introduced, such as duty cycles of the pulses and total time of application, further statistical data results, which data is included in the following table:

TABLE B

| Total Duration, seconds | Peak Amper., mils | Average Amper., mils | Current Duration, millisecs. | Current Interval, millisecs. | Observations |
| --- | --- | --- | --- | --- | --- |
| 1.5 | 50 | 5 | 0.7 | 5 | Quiescent, not out. |
| 1.0 | 100 | 3 | 0.15 | 5 | Do. |
| 1.5 | 100 | 13 | 0.7 | 5 | Out 1–2 mins., light spasm. |
| 1.0 | 100 | 30 | 2.0 | 5 | Out 5 mins., heavy to medium spasm. |
| 5.0 | 100 | 13 | 0.7 | 5 | Out 2–3 mins., light spasm. |
| 1.0 | 140 | 40 | 2.0 | 5 | Out 4–5 mins., heavy spasm. |
| 1.5 | 160 | 20 | 0.7 | 5 | Out 2–3 mins., light spasm. |
| 1.5 | 300 | 40 | 0.7 | 5 | Out 4–5 mins., heavy spasm. |
| 1.5 | 410 | 60 | 0.7 | 5 | Out 6 mins., heavy spasm. |
| 0.3 | 410 | 60 | 0.7 | 5 | Out 5–6 mins., heavy spasm. |
| 1.5 | 550 | 80 | 0.7 | 5 | Out 3–4 mins., heavy spasm. |

The first row of data shows that when the peak data is too small, unconsciousness is not produced. The same is true as illustrated in the second line of the table if the peak current is increased, but the duration of each pulse is drastically reduced. In both cases, the dosage is insufficient. The third line of the table then shows that if the conditions of the second line are repeated, with the duration of each pulse increased materially, unconsciousness results with a duration of application of only 1.5 seconds, and the recovery time of the nervous system is between 1 and 2 minutes. The fourth line shows that by greatly lengthening the duration of each pulse, which increases the total power applied through the animal proportionately, the animal can be knocked out for 5 minutes but at the risk of producing heavy spasms. The fifth row shows what happens if each pulse duration is not increased, but the total time of application is increased. These figures were all made in 100 peak milliamperes. If at this point the peak current is increased to 140 or 160 milliamperes, the animal is more deeply knocked out by 140 milliampere pulse of a duration of 2 milliseconds than by 160 milliampere pulse at a duration of 0.7 millisecond, this data being illustrated in lines 6 and 7 of the table.

By further increasing the peak current to 300 milliamperes, the animal is knocked out for a considerable period of time and heavy spasms result, as illustrated in line 8 of the table. Lines 9 and 10 both illustrate 410 milliamperes peak and different total duration of treatment, and in both cases heavy spasms resulted. Further increasing the current to 550 milliamperes also produced heavy spasms. This table serves to show that heavy peak current results generally in heavy spasms, and that by reducing the peak current the spasms can be lightened until the point is reached where the animal is no longer completely knocked out.

Following these experiments on rats, experiments were performed on hogs to determine the time and current that would produce the desired results. First, experiments were run employing alternating current as shown in the first five lines of Table C, below, and in the last two lines, unidirectional spaced pulses were employed.

TABLE C

*Undesirable effects of alternating current on hogs*

| Current | Volts | Peak Amps. | Observations |
| --- | --- | --- | --- |
| | | Ma. | |
| A.C.—60 cycle | 70 | 400 | Many lung hemorrhages. |
| A.C.—60 cycle | 110 | 450 | Both lungs hermorrhaged. |
| A.C.—60 cycle | 75 | 500 | Extensive bloody congestion both lungs. |
| A.C.—60 cycle | 150 | 800 | Bloody lungs. |
| A.C.—60 cycle | 150 | 500 | Extensive petechial hemorrhages—both lungs. |
| D.C.—100 cycle, 1 on 10 off. | 100 | 500 | Clear lungs—no hemorrhage. |
| D.C.—40 cycle, 6 on 10 off. | 100 | 500 | Do. |

Note that when 60 cycle A.C. are used even though the voltage and current are lower than corresponding values for the direct current, extensive lung damage resulted in every instance, but that when D.C. unidirectional pulses were used, the lungs were free of hemorrhages in each case. The duty cycle ratio on the first line representing D.C. pulses showed the pulse-to-interval ratio was 1:10, whereas in the last line this ratio was 6:10.

The results of a series of tests can be seen in Table D below.

TABLE D

| Peak Volts | Peak Amperes | Average milliamps. | Animal Electric Resistance, ohms | Observations |
| --- | --- | --- | --- | --- |
| 800 | 400×10⁻³ | 70 | 2,000 | Animal out. |
| 320 | 400×10⁻³ | 70 | 800 | Do. |
| 240 | 300×10⁻³ | 55 | 800 | Dazed, not fully out. |
| 320 | 400×10⁻³ | 70 | 800 | Out 3 mins. |
| 720 | 400×10⁻³ | 70 | 1,800 | Animal out. |
| 720 | 400×10⁻³ | 70 | 1,800 | Do. |
| 800 | 400×10⁻³ | 70 | 2,000 | Do. |
| 800 | 400×10⁻³ | 70 | 2,000 | Do. |
| 800 | 400×10⁻³ | 70 | 2,000 | Out 2 mins. |
| 200 | 400×10⁻³ | 70 | 500 | Do. |
| 720 | 400×10⁻³ | 20 | 1,800 | Out—much kicking. |

When taking the data set forth in the above table, the total duration of each treatment was 2 seconds, the current duration of each pulse was 1 millisecond and the interval between each pulse was 5 milliseconds, thus making the frequency of application about 16.6 cycles per second. The current was applied by tong to the head of the animal employing spikes to pierce the skin.

As is generaly known in the art, if the current is applied to the head of the animal so that it passes through the brain, the best results are obtained.

It appears that where square wave pulses are used, as shown in applicant's FIG. 2, the duration of unconsciousness depends upon the area of each pulse, as distinguished from its peak amplitude. Table E shows this effect,

TABLE E
*Effect of current on unconsciousness applied 1.5 seconds*

|   | Average Current, ma. | Peak Current, ma. | Comments |
|---|---|---|---|
| A | 30 | 100 | Unconscious 5 mins. |
| B | 13 | 100 | Unconscious 1-2 mins. |
| C | 3 | 100 | Not unconscious. | illustrating three experimental runs all made at 100 milliamperes peak, but in which pulse widths were varied so as to produce average current values varying between 30 milliamperes to 3 milliamperes. Note that in the former case unconsciousness resulted for about 5 minutes, whereas in the latter case no unconsciousness resulted at all. The total duration of each treatment was 1.5 seconds.

Figure 3:
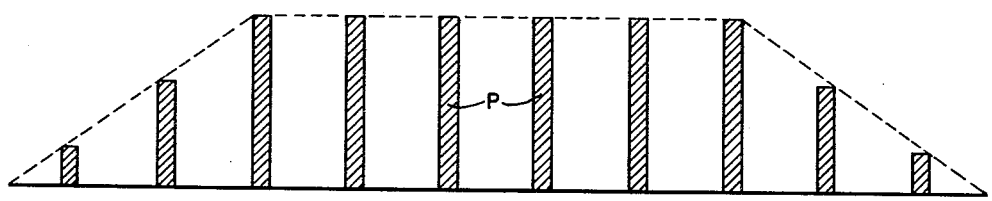
FIG. 3 is a graphical illustration showing a wave form similar to FIG. 1, but gradually increasing at the beginning of the application and gradually decreasing at the end thereof.
Figure 4:
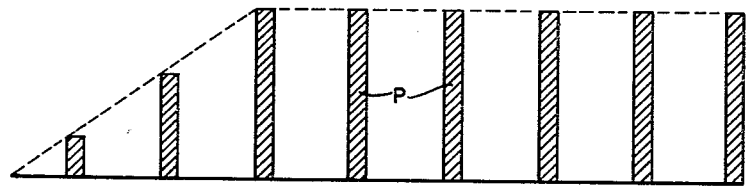
FIG. 4 is a graphical illustration showing a wave form similar to FIG. 1, but gradually increasing with each successive pulse during the first ⅓ of the total time of application.
Figure 5:
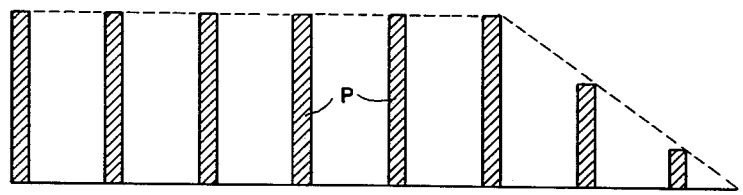
FIG. 5 is a graphical representation of current pulses in which the pulse amplitude for about the last ⅓ of the duration of the treatment is decreased.

Referring now to FIGS. 3, 4, and 5, it has been found that if the current is applied to the head of the animal so that it gradually changes in the manner shown in these figures, less lung hemorrhaging is encountered. It has also been found that the ratio of the current to the duration time of each pulse is probably the most important electrical consideration. Thus, for example 70 average milliamperes applied for 2 seconds will effectively stun the animal, while 17.6 milliamperes if applied for 30 seconds will also produce satisfactory stunning results. Pulsating direct current has been found to be much more effective in reducing damage than alternating current, as set forth above.

When the successive pulses are applied with gradually increasing amplitude, the immediacy of the shocks seems to be reduced, apparently for the reason that the nervous system is not initially severely shocked by a small pulse amplitude, but the amplitude should be built up only as the nervous fatigue renders the animal less sensitive. FIGS. 3 and 4 show two different rise-times of the current pulse beginning at zero, and ending at the full amplitude of the pulse P, the rise time in FIG. 3 being ¼ the total duration, and the rise time in FIG. 4 being ⅓ the total duration. These fractions are exemplary values within a satisfactory range, but are not intended to specify limits thereof. The diminishing of the amplitude at the end of the treatment as shown in FIGS. 3 and 5 is also satisfactory when selected in the vicinity of ⅓ to ¼ the total duration, although not limited thereto.

Referring again to the amplitude of the pulses, however, there does appear to be a peak amplitude which should not be exceeded. Tests have shown that where more than 1.2 peak amperes is employed, excessive hemorrhaging is almost always encountered, and conversely, if the peak amperage is too low, such as 50 milliamperes, then the total time of current application is uneconomically long, or else no amount of current applied at such low peak amperage produces satisfactory unconsciousness. Where the peak amplitude of successive pulses is diminished gradually as shown in FIG. 5 toward the end of each treatment the tension built up in the muscles is not suddenly released, but is gradually diminished with the result that violent twitching does not take place, and the likelihood of hemorrhaging is considerably reduced.

Referring to FIG. 6, and remembering that a very low peak amplitude of about 50 milliamperes produced very uncertain results, it appears that where the length of duty cycle of the pulses is quite low, meaning that the pulses are brief as compared to the intervals therebetween it is satisfactory to use an averaged square wave as shown in this figure with a zero axis near the peak of the negative pulses. In this drawing, if the peaks of the positive pulses P is 100 milliamperes, then the peaks of the negative pulses P′ will only be about 20-25 milliamperes, and the presence of these negative pulses if kept to a minimum in this manner is not damaging. In other words, the wave shape shown in FIG. 6 behaves more like the wave shape shown in the applicant's FIG. 1, than the sine wave shown in the applicant's FIG. 2. In general, then, the use of D.C. current, as distinguished from A.C. current, and the use of a relatively short time duration of the order of a second or two with relatively high peak current intensities effectively produces humane unconsciousness in the animal without causing hemorrhaging. However, if the time is reduced without stepping up the current proportionately, the hemorrhaging is controlled but the animal is not rendered unconscious. On the other hand, if A.C. current is used and the current is stepped up and the time shortened, the frequency of hemorrhaging is also increased. Therefore the discovery set forth in this application successfully circumvents the difficulties encountered with the systems and methods of the prior art, and provides a method that permits for the first time electrical stunning of the animals preparatory to slaughter without the other difficulties which have prevented the prior-art methods from being generally adopted. Thus, the advantages of using an electrical method for stunning animals immediately before slaughter are quite obvious, both from the viewpoint of safety of the operator and also as a humane step introduced into the slaughtering process.

Finally, referring to FIG. 7, this figure shows a suitable system employing a constant-current in the unidirectional pulse generator which can be put on the commercial market, and which provides constant in-current pulses whose duty cycles and repetition rates can be controlled. In view of the great variation in animal response, usually varying between 500 and 2000 ohms, such a constant current generator is highly desirable since it is the current which produces the stunning effect and not the voltage required to drive the current through the head of a particular animal. The constant-current generator shown in FIG. 7 is provided with a reference numeral 1 and derives its power from a source 2 which can be conveniently controlled by a timer 3 serving to control the dosage duration. In most of the examples set forth above, this duration was in the neighborhood of 1 or 2 seconds, and would rarely be expected to exceed 5 seconds. The output of the constant-current unidirectional pulse generator is applied to a pulse amplitude control 4 which is controlled by a separate circuit 5 serving to control the rate of increase or decline of the individual pulses in the manner set forth in FIGS. 3, 4 and 5. The particular details of these circuits are not illustrated because of the fact that the application claims are directed entirely toward method.

Finally, the pulses are delivered to a probe 6 having two electrode spikes extending outwardly therefrom and serving to apply the pulse subcutaneously to the head of the animal.

This application is a continuation-in-part of my prior application Serial No. 747,129, filed July 8, 1958.

While in accordance with the requirements of the statutes there has been illustrated and described a preferred form of embodiment of this invention, it will be apparent to those skilled in the art that changes may be made without departing from the invention as set forth in the appended claims, and that in some cases the features of this invention may be used to advantage without a corresponding use of other features.

What is claimed is:

1. A method of slaughtering animals which comprises passing an electrical current comprising spaced direct current pulses through a portion of the head of the animal as to stun the animal, and shortly thereafter slaughtering it.

2. A method of slaughtering animals which comprises passing an electrical current comprising spaced direct current pulses through a portion of the head of the animal so as to stun the animal, said pulses being spaced by intervals the duration of which are at least as great as a pulse duration, and shortly thereafter slaughtering it.

3. A method of slaughtering animals which comprises passing an electrical current comprising spaced spikes of current through a portion of the head of the animal, said spikes being flat topped with substantially straight sides, the spikes being spaced by intervals of at least the time duration of the spikes.

4. A method of slaughtering animals which comprises passing an electrical current comprising spaced spikes of current through a portion of the head of the animal, said spikes being flat topped with substantially straight sides, the spikes being spaced by intervals of at least the time duration of the spikes, and the current passed having a peak value of from 50 milliamperes to approximately 1.2 amperes.

5. A method of slaughtering animals which comprises passing an electrical current comprising spaced spikes of current through a portion of the head of the animal, said spikes being flat topped with substantially straight sides, the spikes being spaced by intervals of at least the time duration of the spikes, and the current passed having a peak value of from 50 milliamperes to approximately 1.2 amperes, and the repetition rate of the spikes is less than 500 cycles per second.

6. In a method of slaughtering animals, the step of preliminarily passing an electrical current comprising spaced spikes of current through a portion of the animal's head so as to stun the animal, said spikes being spaced by intervals the duration of which is approximately five times that of the spikes, and the current having a peak value of approximatley 400 milliamperes.

7. In a method of slaughtering animals, the step of initially stunning the animal by passing an electrical current through a portion of the head of the animal, said current being of spaced spike form, the spikes being separated by intervals of relatively less current than the spikes, and said current first gradually rising in value and thereafter leveling off.

8. A method of electrically stunning animals preparatory to slaughter, including passing through a portion of the head of the animal mutually-spaced substantially unidirectional pulses within the range of 50 peak milliamperes to 1.2 peak amperes for a duration of treatment of 1 second to 30 seconds.

9. A method of electrically stunning animals preparatory to slaughter, including passing through a portion of the head of the animal mutually-spaced substantially unidirectional pulses within the range of 50 peak milliamperes to 1.2 peak amperes for a duration of treatment of 1 second to 30 seconds, the time duration of each pulse being no greater than the time interval between successive pulses.

10. A method of electrically stunning animals preparatory to slaughter, including passing through a portion of the head of the animal mutually-spaced substantially unidirectional pulses within the range of 50 peak milliamperes to 1.2 peak amperes for a duration of treatment of 1 second to 30 seconds, the amplitudes of the pulses being gradually increased within the first ¼ to ⅓ of the treatment from zero to an amplitude remaining substantially constant during the remainder of the treatment.

11. A method of electrically stunning animals preparatory to slaughter, including passing through a portion of the head of the animal mutually-spaced substantially unidirectional pulses within the range of 50 peak milliamperes to 1.2 peak amperes for a duration of treatment of 1 second to 30 seconds, the amplitudes of the pulses being gradually diminished within the final ⅓ to ¼ of the treatment from a substantially initial amplitude to zero.

12. A method of electrically stunning animals preparatory to slaughter, including passing through a portion of the head of the animal mutually-spaced substantially unidirectional pulses within the range of 50 peak milliamperes to 1.2 peak amperes for a duration of treatment of 1 second to 30 seconds, the amplitudes of the pulses during the first part of a treatment increasing gradually to a selected maximum value, and the amplitude diminishing gradually during the final part of the treatment from said value to zero, and remaining substantially constant during the part of the treatment therebetween.

13. A method for electrically stunning animals preparatory to slaughter including passing through a portion of the head of the animal mutually spaced substantially direct-current pulses of about 400 peak milliamperes for at least 1.5 seconds.

14. A method for electrically stunning animals preparatory to slaughter, including passing through a portion of the head of the animal mutually spaced substantially direct-current pulses of about 400 peak milliamperes for at least 1.5 seconds, the time duration of each pulse being no greater than the time interval between successive pulses.

15. A method for electrically stunning animals preparatory to slaughter, including passing through a portion of the head of the animal mutually spaced substantially direct-current pulses of about 400 peak milliamperes for at least 1.5 seconds, the amplitudes of the pulses being gradually increased within the first ¼ to ⅓ of the treatment from zero to an amplitude remaining substantially constant during the remainder of the treatment.

16. A method for electrically stunning animals preparatory to slaughter, including passing through a portion of the head of the animal mutually spaced substantially direct-current pulses of about 400 peak milliamperes for at least 1.5 seconds, the amplitudes of the pulses being gradually diminished within the final ⅓ to ¼ of the treatment from a substantially constant initial amplitude to zero.

17. A method for electrically stunning animals preparatory to slaughter including passing through a portion of the head of the animal mutually spaced substantially direct-current pulses of about 400 peak milliamperes for at least 1.5 seconds, the amplitudes of the pulses during the first part of a treatment increasing gradually to a selected maximum value, and the amplitude diminishing gradually during the final part of the treatment from said value to zero, and remaining substantially constant during the part of the treatment therebetween.

No references cited.